Patented Nov. 16, 1926.

1,607,279

UNITED STATES PATENT OFFICE.

GUSTAF HENRIK HULTMAN, OF STOCKHOLM, SWEDEN.

METHOD OF PRODUCING PURE ALUMINUM HYDROXIDE.

No Drawing. Application filed May 8, 1925, Serial No. 28,955, and in Sweden January 25, 1924.

In the production of pure aluminum hydroxide by decomposition under heating of raw material containing silicic acid in sulphuric acid we obtain in the first instance a ferruginous solution of sulphate of aluminum. In order to get a pure hydroxide out of this the iron must be removed in some way or other. Several methods have been suggested for accomplishing this, of which some are rather circumstantial. The present invention indicates a simple way of removing the same.

The invention is characterized by the admixture of carbonate of lime with the ferruginous solution of aluminum sulphate, after the iron has been reduced to ferrous salt, whereupon ferrous salt in solution is obtained, which is separated, and in an undissolved condition aluminum hydroxide and calcium sulphate, which last is washed away with water, when pure aluminum hydroxide remains.

It has, of course, previously been known to rid solutions of aluminum sulphate of iron by reducing the ferric salts into ferrous salts and precipitating the aluminum hydrate by means of calcium carbonate. The aluminum hydroxide is however in such processes mixed with gypsum, and it has hitherto been impossible to rid the same of the gypsum in a simple manner. Nobody has thought it practical to wash away the gypsum with water, as it is difficult of solution and it is even very difficult to rid precipitated aluminum hydroxide of substances which are easily soluble in water.

The invention can by way of example be carried into effect in the following manner.

Pottery clay is in a known manner decomposed by heating with sulphuric acid. The filtered solution is reduced with sulphurous acid so that it consists of sulphate of aluminum and ferrous sulphate, and is passed into a lead-lined vessel equipped with a stirrer, where it is stirred together with ground limestone or chalk, until all the sulphate of aluminum has been transmuted into aluminum hydroxide. Besides this there occur in an undissolved condition sulphate of calcium and unaltered ferrous sulphate in solution. Dissolved and undissolved are separated from each other, e. g. in a filter press, and the undissolved is washed with water until all the sulphate of calcium has passed into solution when pure aluminum hydroxide is obtained as a residue, and this is a marketable product after drying in some known manner. By solution in acids pure aluminum salts can be produced from this and by calcination pure alumina for aluminum manufacture.

The solution of aluminum sulphate obtained after the decomposition by heating in sulphuric acid need not be immediately reduced and precipitated with carbonate of lime. If the raw materials containing silicic acid contain potash, alum may for instance be separated from the same in some known manner before the admixture of carbonate of lime.

From the ferruginous aluminum sulphate solution may also, if such be found desirable, be separated sodium sulphate after an admixture of sodium chloride in a known manner. The resulting solution, which then consists of a mixture of a solution of ferruginous chloride of aluminum and sulphate of aluminum, is, after the iron has been reduced into ferrous salt, given an admixture of carbonate of lime and treated in the above stated manner.

Furthermore the ferruginous solution of chloride of aluminum and sulphate of aluminum can in a known manner be heated to a pressure beyond atmospheric pressure for obtaining basic aluminum sulphate deficient in iron, after which the solution, since the hydrochloric acid developed in the process has been blown off and taken care of, and since the iron has been reduced into ferrous salt, is given an admixture of carbonate of lime and treated in the above mentioned manner.

What I claim is:—

The method of producing aluminum hydroxide, which consists in heating an impure aluminum mineral in sulphuric acid thereby to obtain a ferruginous solution of sulphate of aluminum, reducing the iron in said solution to ferrous salt, adding carbonate of lime to the solution, separating out the resulting ferrous salt and undissolved aluminum hydroxide and calcium sulphate, and washing the undissolved portion with water thereby to dissolve the calcium sulphate.

In testimony whereof I have signed my name to this specification.

GUSTAF HENRIK HULTMAN.